United States Patent [19]

Barrett et al.

[11] Patent Number: 4,684,321

[45] Date of Patent: Aug. 4, 1987

[54] HEAT RECOVERY SYSTEM INCLUDING A DUAL PRESSURE TURBINE

[75] Inventors: John R. Barrett, Mesa, Ariz.; Richard A. Cemenska, Edelstein, Ill.; John R. Gladden, Metamora, Ill.; Mark D. Moeckel, Peoria, Ill.; Philip H. Schneider, La Jolla, Calif.

[73] Assignee: Caterpillar Inc., Peoria, Ill.

[21] Appl. No.: 807,407

[22] Filed: Dec. 9, 1985

Related U.S. Application Data

[62] Division of Ser. No. 671,262, Nov. 14, 1984, Pat. No. 4,586,338.

[51] Int. Cl.⁴ .................................................. F01D 9/02
[52] U.S. Cl. ..................................... 415/202; 415/143
[58] Field of Search ............... 415/143, 202, 209, 181, 415/183, 44, 45, 38

[56] References Cited

U.S. PATENT DOCUMENTS

| | | | |
|---|---|---|---|
| 961,086 | 6/1910 | Patitz | 415/143 |
| 1,117,306 | 11/1914 | Banner | 415/44 |
| 1,399,215 | 12/1921 | Kerr | 415/44 |
| 2,184,661 | 12/1939 | Bentley | 415/143 |
| 2,435,042 | 1/1948 | Johansson | 415/143 |
| 3,132,493 | 5/1964 | Peckham et al. | 415/143 |
| 3,719,426 | 3/1973 | Friberg et al. | 415/181 |

Primary Examiner—Robert E. Garrett
Assistant Examiner—John Kwon
Attorney, Agent, or Firm—J. W. Burrows

[57] ABSTRACT

Heat recovery systems are useful, for example, in vehicles that generate large amounts of heat energy during operation. The heat energy is used to drive a dual pressure turbine for producing useful work. In order to fully utilize the great majority of the heat energy produced, the engine exhaust is used to convert a fluid to a gas and superheat the gas to a preselected temperature at a preselected pressure. A first stage of the dual pressure turbine receives the superheated gas and directs the gas at a supersonic velocity against the blades of the rotor. The gas exiting the first stage and the superheated gas at a lower preselected temperature is controllably and substantially separately directed to a second stage at substantially the same velocity. This heat recovery system fully utilizes the heat energy generated by the engine and substantially eliminates the sooting and the formation of oxides within the exhaust system. The dual pressure turbine effectively utilizes the superheated gases to produce useful work at a high system efficiency.

15 Claims, 6 Drawing Figures

HEAT RECOVERY SYSTEM INCLUDING A DUAL PRESSURE TURBINE

This is a division of Ser. No. 671,262 filed Nov. 14, 1984 now U.S. Pat. No. 4,586,338.

DESCRIPTION

1. Technical Field

This invention relates generally to a heat recovery system adapted to use the heat produced by the engine to generate a gas that is subsequently used to drive a dual pressure turbine for producing useful work and more particularly to the components of the system and their interrelationship coupled with the structure of the dual pressure turbine.

2. Background Art

Heat recovery systems are provided in a system to take full advantage of the total energy being produced by an engine. A large amount of energy produced in an engine is lost through the exhaust system and jacket water cooling. Many of the known heat recovery systems use various forms of heat exchangers in the exhaust system to convert the heat in the exhaust to a form that subsequently performs useful work. The steam-based Rankine bottoming cycle heat recovery principle is well known and has the potential to increase total engine performance by utilizing the engine exhaust to perform useful work. One process frequently used converts water to steam and uses the steam to operate miscellaneous services, such as heaters, and to drive a steam turbine. One of the major problems encounter when using the engine exhaust system to convert water to steam is soot fouling of the heat exchanger or boiler that is located in the exhaust system. This soot fouling problem is even more pronounced on systems used in diesel engines. It has been found that the soot thickness is strongly dependent on the temperature of the walls of the tubes in the boiler that are located in the exhaust system. Naturally the more tubes that are used coupled with the lower temperature used in the tubes, the more collection of soot. To optimize a system to accept a 5% loss due to sooting could add 30% to the size and cost of a total system.

Another major problem that is associated with the low tube temperature in the boilers that are located in the exhaust system is the tendency for various gases to precipitate out of the exhaust gas due to the lower tube temperature. These gases form oxides that chemically attack the various metals in the exhaust system thus shortening their useful life.

Various forms of turbines have been used in the Rankine bottoming cycle systems. These range from single or multiple stage high pressure tubines to single or multiple stage low pressure turbines and to a mix of low pressure and high pressure turbines. The main objectives considered in determining the type of turbine to use is maximizing performance, controlling the cost versus performance, and controlling total package size. It has been generally found that the more stages used in the turbine, the greater the system efficiency. However, both the cost and size of the turbine increases with an increase in the number of stages used. Many times the cost of added stages will increase at a much higher rate than that of the system performance.

Of the dual pressure turbines used, some of them direct the high pressure steam to only the high pressure side and the low pressure steam to the low pressure side and subsequently to the outlet port. These normally fail to efficiently use all of the available work in the steam or they have to use many turbine stages thus adding significantly to the total cost. Of the other dual pressure turbines used, the exhaust steam from the high pressure stage or stages is directed to a mixing chamber where it mixes with a low pressure steam and directed into the low pressure stages. The mixing chamber is primarily provided to ensure that the temperature, pressure, and velocity of the steam from the high pressure stage is respectively equalized with the temperature, pressure, and velocity of the low pressure steam prior to entering the low pressure stages. The mixing chamber that is normally used increases the size of the total package and further adds the possibility of unwanted turbulence in the chamber.

The present invention is directed to overcoming one or more of the problems as set forth above.

DISCLOSURE OF THE INVENTION

In one aspect of the present invention, a heat recovery system is provided for an engine having a liquid cooling system for transferring heat energy away from the engine and an exhaust system. The system includes a first heat exchanger having an inlet port and an outlet port and is located in heat transferring relation to the liquid cooling system, a second heat exchanger having an inlet port and an outlet port and is located in heat transferring relation to the exhaust system, and a third heat exchanger having an inlet port and an outlet port and is located in heat transferring relation to the exhaust system. A source of pressurized fluid is connected to the first and third heat exchangers. A means is provided for preheating the fluid from the source and is located in the system between the source and the first and third heat exchangers. A first means is provided for controllably directing a portion of the preheated fluid at a preselected pressure to the inlet port of the first heat exchanger so that the preheated fluid is converted to a gas at the preselected pressure and for subsequently directing the gas from the outlet of the first heat exchanger to the inlet of the second heat exchanger so that the gas at the preselected pressure is superheated to a preselected temperature. A second means is provided for controllably directing the other portion of the preheated fluid, at a preselected pressure higher than the preselected pressure of the gas from the first means, to the inlet port of the third heat exchanger so that the other portion of the preheated fluid is converted to a gas at the higher preselected pressure and superheated to a preselected temperature higher than the temperature of the gas from the first means. The system further includes a dual pressure turbine having a high temperature and pressure inlet port connected to the outlet port of the third heat exchanger, a low temperature and pressure inlet port connected to the outlet port of the second heat exchanger, an outlet port connected to a condenser that is adapted to convert the outlet gas to a fluid, and an output shaft adapted to transmit a working force from the dual pressure turbine in response to the superheated gases from the respective second and third heat exchangers being directed therethrough.

In another aspect of the present invention, a dual pressure turbine is provided to generate an output force in response to the flow of a gas therethrough. The dual pressure turbine includes a housing having a first inlet port adapted for connection with a source of gas at a preselected high pressure level and superheated to a preselected high temperature. A first stage is defined in the housing and includes a first rotor chamber, a first rotor having a plurality of blades secured around the periphery and is rotatably positioned in the first rotor chamber, a first plurality of nozzles interconnecting the first inlet port and the first rotor chamber adjacent a preselected number of blades of the first plurality of blades, and an outlet passage connected with the first rotor chamber adjacent at least the preselected number of blades. A second stage is defined in the housing and includes a second rotor chamber, a second rotor having a second plurality of blades secured around the periphery and is rotatably positioned in the second rotor chamber and drivingly connected to the first rotor, a second plurality of nozzles opening into the second rotor chamber adjacent the second plurality of blades and the nozzles are evenly spaced therearound, and an outlet passage connected to the second rotor chamber. A second inlet port is located in the housing and is adapted for connection with a second source of gas at a preselected pressure lower than the preselected high pressure and superheated to a temperature lower than the preselected high temperature. A first passage means is provided for connecting the second inlet port with the second plurality of nozzles so that the gas from the second source of gas is substantially axially directed to the second plurality of nozzles at a predetermined velocity and a second passage means connects the outlet passage of the first stage with the second plurality of nozzles so that the gas from the outlet passage of the first stage is substantially axially and substantially separately directed to the second plurality of nozzles at substantially the same velocity as the predetermined velocity of the gas from the second source.

The present invention provides a heat recovery system that fully utilizes the heat generated by the engine to drive a dual pressure turbine to produce useful work. The cooling system or more specifically the jacket water of the engine absorbs sufficient heat energy and the jacket water is passed through a heat exchanger to convert a fluid to a gas and then superheat the gas for effective use in the turbine. Another heat source from the engine, such as the oil lubrication system, provides sufficient heat to preheat the fluid before it enters the third heat exchanger located in heat transferring relation to the exhaust system. This relationship maintains an increased temperature at the inlet port of the heat exchanger thus reducing the sooting problem and the precipitation of acidic gases. The first and second passage means in the dual pressure turbine cooperate to ensure that the temperature, pressure, and velocity of the respective gases from the outlet passage of the first stage and the second source are respectively substantially equal before entering the second stage. This arrangement eliminates a mixing chamber between the first and second stages thus also eliminating the possibility of turbulence that could exist in the mixing chamber.

BEST MODE FOR CARRYING OUT THE INVENTION

Figure 1:
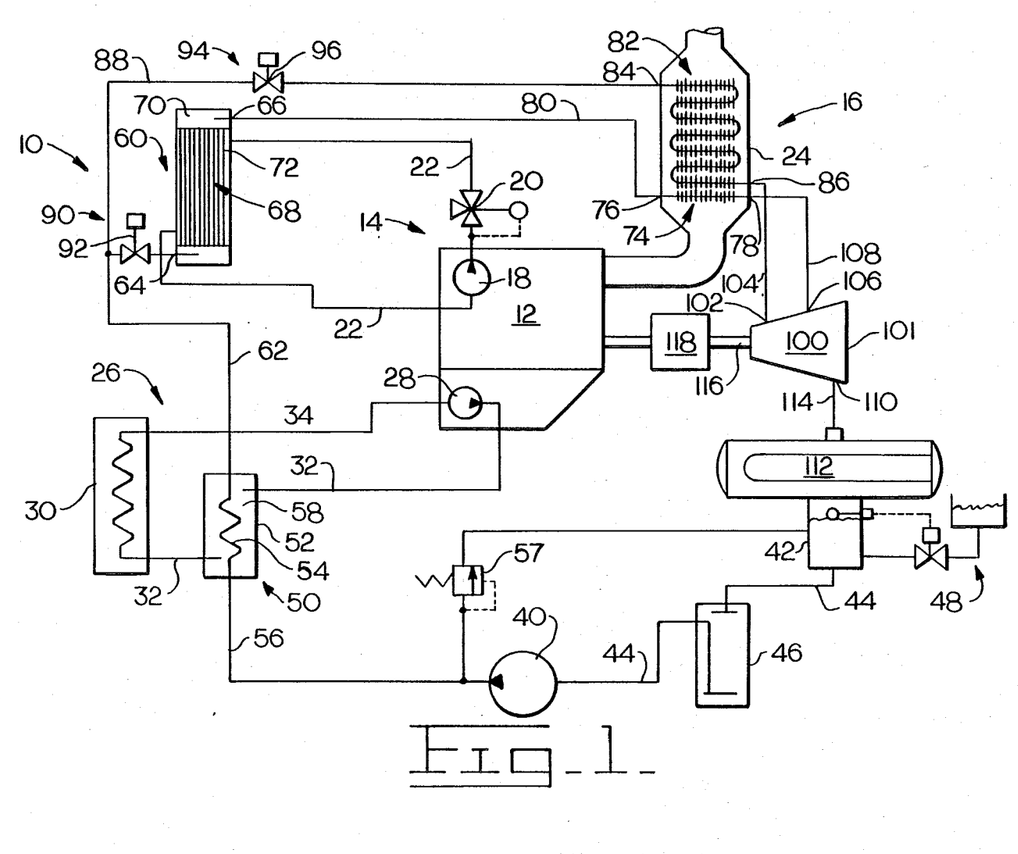
FIG. 1 is a partial schematic and diagrammatic representation of a heat recovery system incorporating an embodiment of the present invention.

Referring now to the drawings, and more specifically to FIG. 1, a heat recovery system 10 is provided for use on an engine 12 having a liquid cooling system 14 and an exhaust system 16. The liquid cooling system 14 includes a pump 18 for circulating cooling fluid through a known water jacket (not shown) in the engine, a thermostat 20 adapted to control the temperature of the cooling fluid, and the associated cooling lines 22. The exhaust system 16 includes an exhaust manifold pipe 24 cpnnected to the engine 12.

The engine 12 further includes an oil cooling system 26. The oil cooling system 26 includes an oil pump 28 for circulating the hot lubricating oil of the engine 12 to an oil cooler 30 and the connecting lines 32 and 34 to provide a path for the continuous circulation of the oil from the engine 12 to the oil cooler 30 and back to the engine 12.

The system 10 includes a source of pressurized fluid, such as a pump 40. The pump 40 draws a fluid, such as water, from a reservoir 42 by way of a conduit 44. A fluid polisher 46 is provided in the line 44 and is adapted to remove minerals and other deposits from the water. A source 48 of make-up water is provided to replenish the water in the reservoir 42 if it becomes low.

A means 50 is provided for preheating the water from the pump 40. The preheating means 50 includes the oil cooling system 26 and a housing 52 having a first fluid passageway 54 connected to the pump 40 by a conduit 56. A relief valve 57 is connected to the conduit 56 and controls the maximum pressure of the fluid in the conduit 56. The housing 52 is located in the conduit 32 of the oil cooling system 26 and defines a second fluid passageway 58 interconnecting the conduit 32 within the housing 52. The second fluid passageway is operatively associated in heat transferring relation with the first fluid passageway and is adapted to transfer the heat energy in the hot oil from the engine 12 to the water passing through the first fluid passageway 54.

A first heat exchanger 60 is connected to the preheating means 50 by a conduit 62. The first heat exchanger includes an inlet port 64, an outlet port 66, and an evaporator 68. The evaporator has a first fluid passageway 70 connected between the inlet port 64 and the outlet port 66. A second fluid passageway 72 is located in the evaporator 68 and connected to the cooling lines 22 so that the pump 18 continuously circulates the engine cooling fluid. The second fluid passageway 72 is operatively associated in heat transferring relation with the first fluid passageway 70 so that the heat energy in the engine cooling fluid in the second fluid passageway 72 is transferred to the fluid or water in the first fluid passageway 70. This heat energy is sufficiently high to convert the water in the first fluid passageway 70 to a steam.

A second heat exchanger 74 has an inlet port 76 and an outlet port 78 and is located in the exhaust manifold pipe 24. A conduit 80 connects the inlet port of the second heat exchanger 74 with the outlet port 66 of the first heat exchanger 60.

A third heat exchanger 82 has an inlet port 84 and an outlet port 86 and is also located in the exhaust manifold pipe 24. A conduit 88 connects the inlet port 84 of the third heat exchanger 82 with the conduit 62.

A first means 90 is provided for controllably directing a portion of the preheated water at a preselected pressure to the inlet port 64 of the first heat exchanger 60 so that the preheated fluid is converted to a steam or gas at substantially the preselected pressure and for subsequently directing the steam from the outlet port 66 of the first heat exchanger 60 to the inlet port 76 of the second heat exchanger 74 so that the steam at the preselected pressure is superheated to a preselected temperature. The first means 90 for controllably directing includes a flow control valve 92 operatively connected in the conduit 62 between the inlet port 64 of the first heat exchanger and the point of connection of the conduit 88 with the conduit 62.

A second means 94 is provided for controllably directing the other portion of the preheated water, at a preselected pressure higher than the preselected pressure of the preheated water from the first means 90, to the inlet port 84 of the third heat exchanger 82 so that the other portion of the preheated fluid is converted to a steam at the higher preselected pressure and superheated to a preselected temperature higher than the temperature of the steam from the first means 90. The second means for controllably directing includes a second flow control valve 96 located in the conduit 88.

A dual pressure turbine 100 is provided in the heat recovery system 10 and includes a housing 101 having a first inlet port 102 connected to the outlet port 86 of the third heat exchanger 82 by a conduit 104, a second inlet port 106 connected to the outlet port 78 of the second heat exchanger by a conduit 108, and an outlet port 110 connected to a condenser 112 by a conduit 114. The condensed fluid from the condenser 112 returns directly to the reservoir 42 for reuse in the heat recovery system 10.

An output shaft 116 connects the dual pressure turbine 100 to a common load 118 that is also driven by the engine 12.

Figure 2:
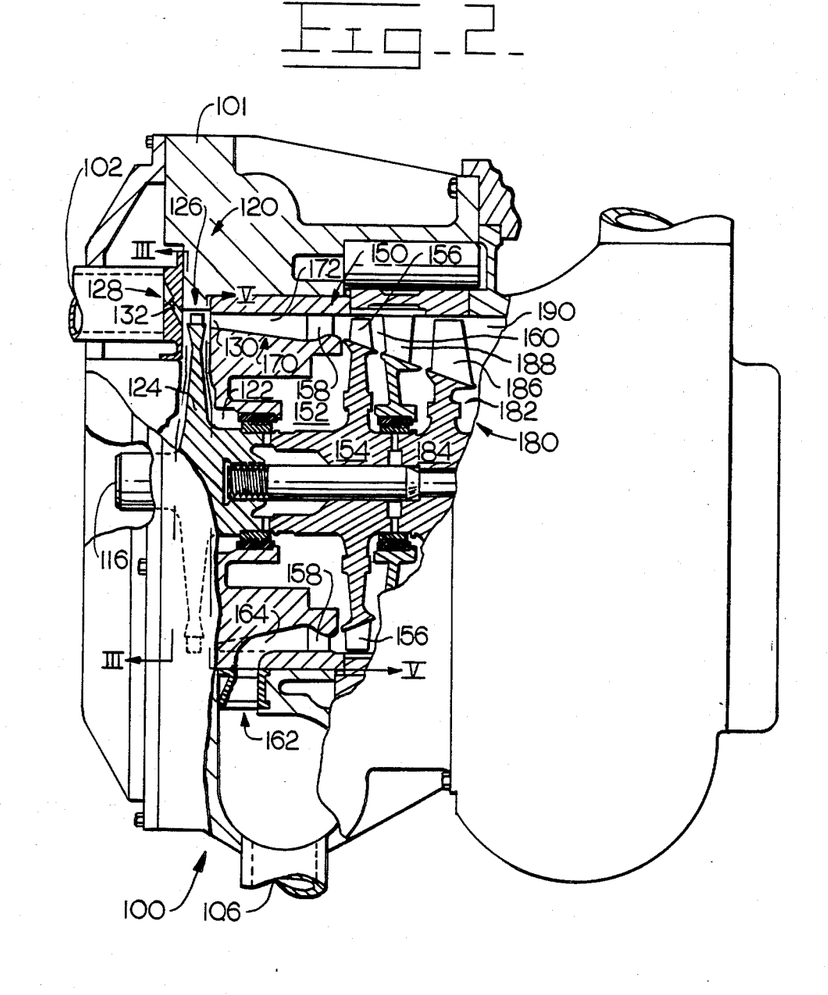
FIG. 2 is a partial sectional view, illustrating in greater detail, one of the components shown in FIG. 1.

As is best shown in FIG. 2, a first stage 120 is located in the housing 101 and includes a first rotor chamber 122, a first rotor 124 rotatably positioned in the first rotor chamber 122, a first plurality of blades 126 evenly spaced and secured around the outer periphery of the rotor 124, a first plurality of nozzles 128 interconnecting the first inlet port 102 and the first rotor chamber 122, and an outlet passage 130.

Figure 3:
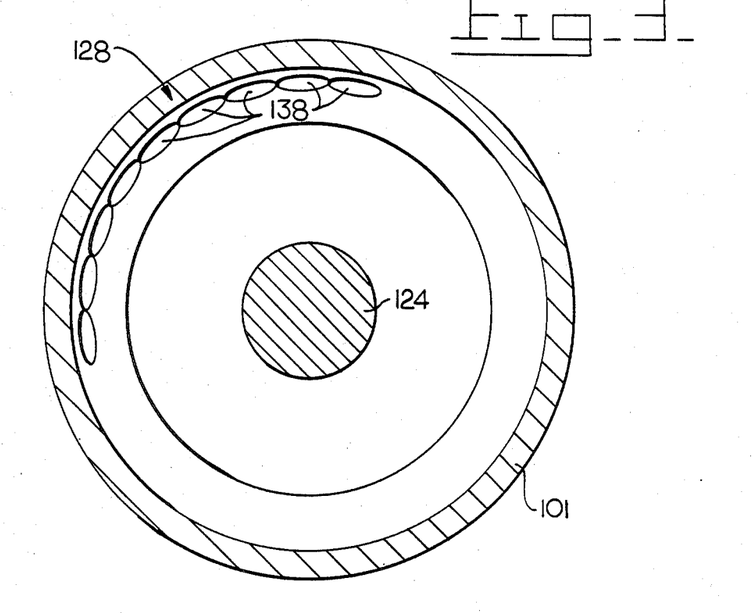
FIG. 3 is a partial section taken along the line III—III of FIG. 2.

For ease of illustration, a nozzle 132 is shown in FIG. 2 rotated 90° out of location. The nozzle 132 as illustrated should be rotated 90° to be positioned in the top plane as properly illustrated in FIG. 4. Each nozzle 132 of the plurality of nozzles 128, as better illustrated in FIG. 4 has a bellmouth inlet 134 formed by a radius of curvature equal to ½ the diameter of a throat portion 136. The throat portion 136 has an axial straight length equal to ½ the diameter of the throat. An outlet portion 138 has a conical surface with an included angle of approximately 10°. As further illustrated in FIGS. 2 and 3, the outlet portion 138 of each nozzle 132 opens into the first rotor chamber 122. The plurality of nozzles 128 cover an arc of approximately 136° and open into the first rotor chamber 122 adjacent the plurality of blades 126.

Figure 4:
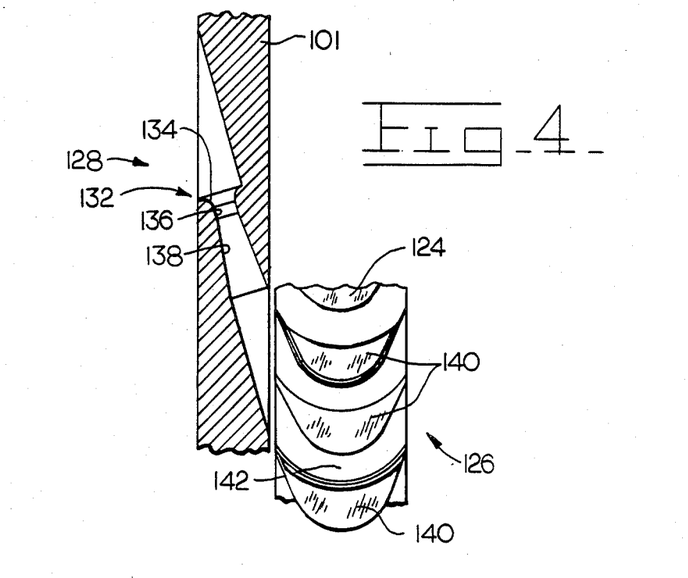
FIG. 4 is an enlarged partial section of one of the nozzles and three of the rotor blades of the first rotor of FIG. 2 shown in their true position.

Each blade 140 of the plurality of blades 126 are shaped such that a passage 142 between each pair of blades is of a constant width. The height and width of each blade 140 is substantially the same as the height of the minor diameter of each of the outlet portions 138 of the plurality of nozzles 128.

A second stage 150 is located in the housing 101 and includes a second rotor chamber 152, a second rotor 154 rotatably positioned in the second rotor chamber 152, a second plurality of blades 156 evenly spaced and secured around the periphery of the second rotor 154, a second plurality of evenly spaced nozzles 158 opening into the second rotor chamber 152 adjacent the second plurality of blades, and an outlet passage 160.

A first passage means 162 is provided for connecting the second inlet port 106 with the second plurality of nozzles 158 so that the steam from a source, such as the second heat exchanger 74, is substantially axially directed to a first portion of the nozzles of the second plurality of nozzles 158 at a predetermined velocity. The first passage means 162, as better illustrated in FIGS. 5 and 6, includes an arcuate slot 164 connected to the second inlet port 106. At the area of connection with the second inlet port 106, the arcuate slot 164 has a predetermined cross-sectional area and defines an arc of approximately 200°. The cross-sectional area decreases as the arcuate slot 164 extends towards the second plurality of nozzles 158. The 200° angle of arc remains substantially constant and the arcuate slot opens to the second plurality of nozzles 158 in a substantially axial direction.

A second passage means 170 is provided for connecting the outlet passage 130 of the first stage 120 with the other portion of nozzles of the second plurality of nozzles 158 so that the steam from the outlet passage 130 of the first stage 120 is substantially axially directed to the other portion of the plurality of nozzles 158 at substantially the same velocity as the predetermined velocity of the steam from the second inlet port 106. The second passage means 170, as better illustrated in FIGS. 5 and 6, includes an arcuate slot 172 connected to the outlet passage 130 of the first stage 120. At the area of connection with the outlet passage 130, the arcuate slot 172 has a predetermined cross-sectional area and defines an arc of approximately 160°. The cross-sectional area increases as the arcuate slot 172 extends towards the second plurality of nozzles 158. The 160° angle of arc remains substantially constant and the arcuate slot 172 extends towards the second plurality of nozzles 158 in a substantially axial direction.

A third stage 180 is located in the housing 101 and includes a third rotor chamber 182, a third rotor 184 rotatably positioned in the third rotor chamber 182, a third plurality of blades 186 evenly spaced and secured around the periphery of the third rotor, a third plurality of evenly spaced nozzles 188 connected to the outlet passage 160 of the second stage 150 and opening into the third rotor chamber 182 adjacent the third plurality of blades, and an outlet passage 190 connected to the outlet port 110.

It is recognized that various types of fluids could be used in this heat recovery system without departing from the essence of the invention, but preferably water is used due to its availability and ability to absorb large amounts of heat energy.

Industrial Applicability

During operation of the heat recovery system 10, water from the reservoir 42 is drawn into the pump 40 and directed into the conduit 56 at a predetermined pressure level of for example 2140 kPa (310 psi) as established by the relief valve 57. The polisher 46 sufficiently cleans the water so that no impurities or other deposits are allowed to pass through. These deposits, if allowed to pass through would possibly cause lime or other deposits to form in the system thus reducing the overall efficiency of the heat recovery system.

The pressurized water in conduit 56 flows through the first passageway 54 of the preheating means 50 and is preheated by the hot oil in the lubrication system. Due to the temperature of the oil, the water in the first passageway 54 is preheated to approximately 105° C. (220° F.). Because the water in the conduit 56 is under pressure, it does not convert to steam.

The preheated water is directed to the evaporator 68 of the first heat exchanger 60 by the conduit 62. The flow control valve 92 in the conduit 62 controls the flow entering the first heat exchanger 60 and also controls the pressure of the fluid to approximately 130 kPa (19 psi). As the preheated water passes through the first fluid passageway 70 of the evaporator 68, the heat in the second fluid passageway 72 from the jacket water of the engine 12 adds heat energy to the water and converts the water to steam. Since the temperature of the fluid in the water jacket is approximately 121° C. (250° F.) and the pressure of the fluid is approximately 130 kPa, the water is converted to steam and exits at 121° C. and 130 kPa. The steam from the first heat exchanger 60 is directed to the second heat exchanger 74 where it is superheated to a temperature of approximately 182° C. (360° F.)

The exhaust from the engine 12 is used to superheat the steam in the second heat exchanger 74. The temperature of the exhaust as it leaves the engine 12 is approximately 460° C. (860° F.). By sizing the second heat exchanger 74, the steam is superheated to a predetermined temperature and maintained at the predetermined pressure level of 130 kPa.

The other portion of the preheated water in conduit 62 is directed to the third heat exchanger 82 through the conduit 88. The flow control valve 96 in the conduit controls the flow entering the third heat exchanger 82 and also controls the pressure of the fluid to approximately 1724 kPa (250 psi). By properly sizing the third heat exchanger 82, the preheated water entering the third heat exchanger 82 is converted to steam and superheated to approximately 415° C. (780° F.) and maintained at the 1724 kPa pressure level.

After passing across both the second and third heat exchangers 74,82, sufficient heat energy in the exhaust has been used so that the temperature of the exhaust as it leaves the exhaust manifold pipe is approximately 204° C. (400° F.).

By using the heat energy in the oil cooling system 26 to preheat the water from the pump 40 and by using the heat energy in the jacket water of the engine 72 to convert some of the preheated water to steam, then the heat energy in the exhaust system is sufficient to convert the remainder of the water to steam and to superheat both quantities of steam to their respective preselected temperatures. This arrangement provides the greatest effective use of the potential heat energy from the engine 12. Furthermore, since the heat energy from the jacket water is being dissipated, a radiator normally will not be required in the system. By ensuring that the temperature of all fluids entering the second and third heat exchangers 74,82 are above a preselected level, the problems of sooting and oxide formations are greatly reduced. This helps both the efficiency of the system and the life of the elements of the second and third heat exchangers 74,82 located in the exhaust system 16.

The dual pressure turbine 100 is used to convert the superheated steam into useful work. The superheated steam at 460° C. and 1724 kPa is connected to the first inlet port 102 of the dual pressure turbine 100 and the superheated steam at 121° C. and 130 kPa is connected to the second inlet port 106.

The superheated steam in the first inlet port 102 is directed into the first rotor chamber 122 through the first plurality of nozzles 128. Based on the volume of superheated steam produced and the pressure thereof, nine nozzles 132 are used to direct the superheated stream to the blades 126 of the first stage rotor 124.

Due to the shape of each of the nine nozzles, the velocity of the steam is increased such that the steam impinges the blades at supersonic speed. It has been found that the highest efficiency of the first stage is attributed to the high velocity of the superheated steam, the very close spacing of the nozzle exits, and the controlled constant spacing between the blades 126 on the rotor 124. Furthermore, the height and width of each of the blades 126 is substantially the same as the height of the minor diameter of each of the nozzle exits 138. These relationships provide a desired speed of 50,000 rpm.

Figure 5:
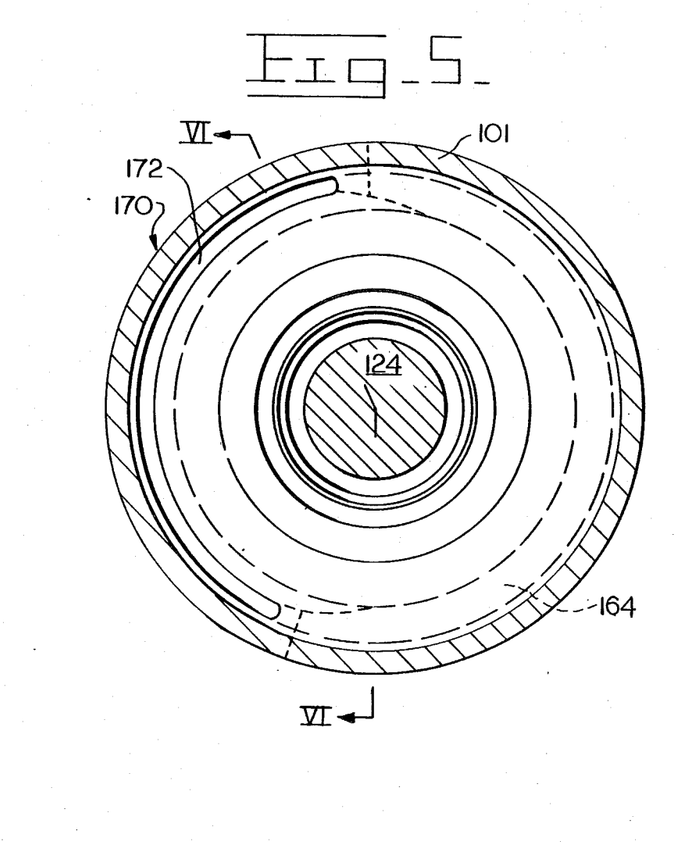
FIG. 5 is a partial section taken along the line V—V of FIG. 2.

The superheated steam leaves the blades 126 first stage rotor 124 at a velocity of approximately 137 m/sec (450 ft/sec), a temperature of approximately 182° C. (360° F.); and a pressure of approximately 130 kPa (19 psi). The pressure differential between the pressure of the steam entering the first stage 120 and the pressure of the steam leaving the first stage 120 results in a first stage turbine having a pressure ratio of approximately 13:1. The superheated steam enters the arcuate slot 172 and is directed towards the second plurality of nozzles 158. Due to the increasing cross-sectional area of the arcuate slot, the velocity of the superheated steam is decreased to approximately 76 m/sec (250 ft/sec) prior to entering the second plurality of nozzles 158. Because the arcuate angle of the arcuate slot 172 is approximately 160°, the superheated steam from the first stage is directed substantially only to a portion of the second plurality of nozzles 158 equal to the arcuate angle of the arcuate slot 172.

Figure 6:
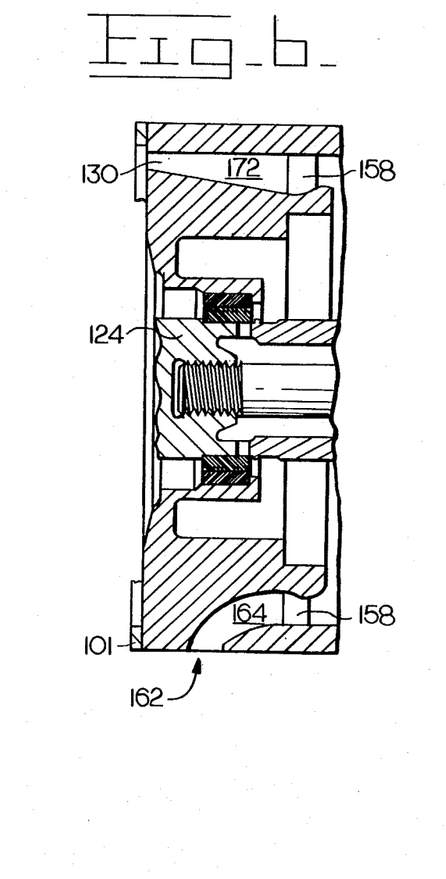
FIG. 6 is a section taken along line VI—VI of FIG. 5.

The superheated steam at the second inlet port 106 is communicated with the second plurality of nozzles 158 through the arcuate slot 164. The velocity of the superheated steam at the second inlet port is approximately 30 m/sec (100 ft/sec) and has a temperature of approximately 182° C. Since the cross-sectional area of the arcuate slot 164 decreases in size as it extends towards the second plurality of nozzles 158, the velocity of the steam is increased to approximately 76 m/sec (250 ft/sec) prior to entering the second plurality of nozzles 158. Because the arcuate angle of the arcuate slot 164 is approximately 200°, the superheated steam from the second inlet port is directed substantially only ro the other portion of the plurality of nozzles 158 equal to the arcuate angle of the arcuate slot 164.

It is desirable that the superheated steam be directed into the second plurality of nozzles 158 in a substantially axial direction in order to generally eliminate turbulence in the steam flow. Furthermore, in order to maximize the efficiency of the turbine 100, the respective temperature, pressure, and velocity of the superheated steam from the second inlet port 106 and the outlet passage 130 of the first stage 120 should be substantially equal prior to entering the second plurality of nozzles 158.

Wherein the first stage 120 is only a partial admission stage of approximately 37.8% admission, the second stage 150 is a full admission stage receiving the superheated steam from two different sources. The superheated steam exiting the second stage 150 enters the third plurality of nozzles 188 of the third full admission stage 180. The superheated steam exiting the third stage 180 is connected to the outlet port 110 and directed to the condenser 112 where it is condensed back to water and returned to the reservoir 42.

The heat recovery system 10 as described above provides a system having an operating efficiency above 20% and the dual pressure turbine 100 in the system has an operating efficiency above 80% and most effectively utilizes the heat energy produced by the engine 12 while limiting total size and controlling the cost. The three stage dual pressure turbine 100 effectively utilizes the superheated steam produced from the heat energy in the engine 12 by using a first impulse stage having steam at supersonic velocity impinging the blades of the first stage rotor. Furthermore the velocity of the steam exiting the first stage and the steam entering the second inlet port is controlled so that when they enter the second stage their velocities are substantially the same. The second and third stages are full admission transonic reaction stages. The above three stage dual pressure turbine arrangement maintains the superheated steam in a superheated condition all the way through each stage. If any droplets of water form while in any of the three stages, they would erode away material thus causing damage and shortening the effective life of the dual pressure turbine.

Other aspects, objects and advantages of this invention can be obtained from a study of the drawings, the disclosure and the appended claims.

We claim:

1. A dual pressure turbine adapted to generate an output force in response to the flow of a gas therethrough, comprising:

a housing having a first inlet port adapted for connection with a source of gas at a preselected high pressure level and superheated to a preselected high temperature;

a first stage defined in the housing and including a first rotor chamber, a first rotor having a plurality of blades secured around the periphery and being rotatably positioned in the first rotor chamber, a first plurality of nozzles interconnecting the first inlet port and the first rotor chamber adjacent a preselected number of blades of the first plurality of blades, and an outlet passage connected with the first rotor chamber adjacent at least the preselected number of blades;

a second stage defined in the housing and including a second rotor chamber, a second rotor having a second plurality of blades secured around the periphery and being rotatably positioned in the second rotor chamber and drivingly connected to the first rotor, a second plurality of nozzles opening into the second rotor chamber adjacent the second plurality of blades and being evenly spaced therearound, and an outlet passage connected to the second rotor chamber;

a second inlet port located in the housing and being adapted for connection with a second source of gas at a preselected pressure lower than the preselected high pressure and superheated to a temperature lower than the preselected high temperature;

first passage means for connecting the second inlet port with the second plurality of nozzles so that the gas from the second source of gas is substantially axially directed to the second plurality of nozzles at a predetermined velocity, said first passage means includes an arcuate slot defined in the housing connecting the second inlet port with the second plurality of nozzles;

second passage means for connecting the outlet passage of the first stage with the second plurality of nozzles so that the gas from the outlet passage of the first stage is substantially axially directed to the second plurality of nozzles at substantially the same velocity as the predetermined velocity of the gas from the second source, said second passage means includes a second arcuate slot defined in the housing connects the outlet passage from the first stage with the second plurality of nozzles, said first and second arcuate slots being adapted to direct the gas to the second plurality of nozzles in substantially an axial direction and wherein a cross sectional area of the first arcuate slot is progressively decreased between the second inlet port and the second plurality of nozzles so that the velocity of the gas from the second inlet port is increased to substantially the predetermined velocity, and a cross sectional area of the second arcuated slot is inceased between the outlet passage of the first stage and second plurality of nozzles so that the velocity of the gas from the first stage is decreased to substantially the predetermined velocity.

2. The dual pressure turbine, as set forth in claim 1, wherein the first arcuate slot directs the gas from the second inlet port to substantially only one portion of the nozzles of the second plurality of nozzles and the second arcuate slot directs the gas from the outlet passage of the first stage to substantially only the other portion of the nozzles of the second plurality of nozzles.

3. The dual pressure turbine, as set forth in claim 2, wherein the first arcuate slot defines an arc of approximately 200°.

4. The dual pressure turbine, as set forth in claim 3, wherein the second arcuate slot defines an arc of approximately 160°.

5. The dual pressure turbine, as set forth in claim 4, including a third stage defined in the housing and having a third rotor chamber, a third rotor having a third plurality of blades secured around the periphery and being rotatably positioned in the second rotor chamber and drivingly connected to the second rotor, a third plurality of nozzles connected to the outlet passage of the second stage and opening into the third rotor chamber adjacent the third plurality of blades and being evenly spaced therearound.

6. The dual pressure turbine, as set forth in claim 5, wherein the gas of the first and second sources of gas is a steam.

7. The dual pressure turbine, as set forth in claim 1, wherein each of the nozzles of the first plurality of nozzles is constructed and arranged to increase the velocity of the high temperature and high pressure gas so that the gas impinges the blades of the first plurality of blades at a supersonic velocity.

8. The dual pressure turbine, as set forth in claim 7, wherein the first and second passage means are constructed and arranged to control the velocity, pressure, and temperature of the respective gas from the outlet passage of the first stage and the second inlet port so that the respective velocities, pressures, and temperatures of all of the gas entering the second plurality of nozzles are substantially equal.

9. The dual pressure turbine, as set forth in claim 8, wherein the gas from the first and second source of gas is a steam.

10. A dual pressure turbine, comprising:
 a first partial admission stage adapted for connection with a source of high temperature and high pressure gas said first partial admission stage has an inlet portion which substends and arc of less than 360°;
 a second full admission stage adapted for connection with an outlet of the first stage and a source of low temperature and low pressure gas;
 first means for connecting the outlet of the first stage with substantially only a portion of the second stage; and
 second means for connecting the source of low temperature and low pressure gas with substantially only the other portion of the second stage.

11. The dual pressure turbine, as set forth in claim 10, wherein a portion of the first stage is constructed and arranged increases the velocity of the high temperature and high pressure gas within the first stage to a supersonic velocity.

12. The dual pressure turbine, as set forth in claim 11, wherein the inlet portion of the first stage is a plurality of nozzles.

13. The dual pressure turbine, as set forth in claim 10, wherein the first and second means respectively are constructed and arranged to control the velocity of the respective gases so that the velocity of the gases are substantially the same prior to entering the second stage.

14. The dual pressure turbine, as set forth in claim 13, including a third full admission stage adapted for connection with an outlet of the second stage.

15. The dual pressure turbine, as set forth in claim 14, wherein the gas is a steam.

* * * * *

UNITED STATES PATENT AND TRADEMARK OFFICE
CERTIFICATE OF CORRECTION

PATENT NO. : 4,684,321
DATED : August 4, 1987
INVENTOR(S) : John R. Barrett, Richard A. Cemenska, John R. Gladden, Mark D. Moeckel and Philip H. Schneider It is certified that error appears in the above–identified patent and that said Letters Patent are hereby corrected as shown below:

Column 12, line 6, after "arranged" insert --to--.

Signed and Sealed this

Twenty-ninth Day of December, 1987

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,684,321

DATED : August 4, 1987

INVENTOR(S) : John R. Barrett, Richard A. Cemenska, John R. Gladden, Mark D. Moeckel and Philip H. Schneider It is certified that error appears in the above-identified patent and that said Letters Patent is hereby corrected as shown below:

Column 11, line 14, "substends and" should be --subtends an--.

Column 12, line 6, "increases" should be --increase--.

Signed and Sealed this

Third Day of May, 1988

Attest:

DONALD J. QUIGG

*Attesting Officer*

Commissioner of Patents and Trademarks